United States Patent

Fuhr et al.

[15] 3,664,937
[45] May 23, 1972

[54] PHOTOSENSITIZING MOLDING AND COATING COMPOSITIONS WITH BENZOIN-SILYL-ESTERS

[72] Inventors: Karl Fuhr; Hugo Vernaleken; Hans-Georg Heine, all of Krefeld; Hans Rudolph, Krefeld-Bockum; Hermann Schnell, Krefeld-Uerdingen, all of Germany

[73] Assignee: Farbenfabriken Bayer Aktiengesellschaft, Leverkusen, Germany

[22] Filed: May 27, 1971

[21] Appl. No.: 147,675

Related U.S. Application Data

[62] Division of Ser. No. 867,938, Oct. 20, 1969.

[30] Foreign Application Priority Data

Nov. 6, 1968  Germany.....................P 18 07 297.4

[52] U.S. Cl. ..............204/159.15, 204/159.23, 260/448.8 R
[51] Int. Cl.........................................C08d 1/00, C08f 1/16
[58] Field of Search..............................204/159.23, 159.15; 260/448.8 R

[56] References Cited

UNITED STATES PATENTS 3,582,487   6/1971   Fuhr et al. .........................204/159.23

*Primary Examiner*—John C. Bleutge
*Assistant Examiner*—Richard B. Turer
*Attorney*—Connolly and Hutz

[57] ABSTRACT

The invention relates to possibly α-substituted benzoin-silyl-esters which are useful photosensitizers for the photopolymerization of polymerizable compounds or compound mixtures including mixtures of unsaturated polyesters and copolymerizable monomeric compounds.

7 Claims, No Drawings

PHOTOSENSITIZING MOLDING AND COATING COMPOSITIONS WITH BENZOIN-SILYL-ESTERS

CROSS REFERENCE TO RELATED APPLICATION

This application is a division of application Ser. No. 867,938, filed Oct. 20, 1969.

The object of the invention are benzoin-silyl-esters of formula

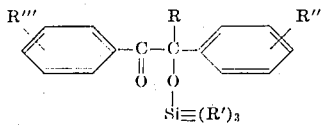

wherein R represents hydrogen, lower alkyl or alkenyl having one to about four C-atoms, aralkyl or phenyl, R' represents lower alkyl having one to about four C-atoms, preferably methyl, and R'' and R''', which may be identical or different, represent hydrogen, halogen, lower alkyl having one to about four C-atoms, or methoxy.

Typical examples of such benzoin-silyl-esters are:

| | | |
|---|---|---|
| Benzoin-trimethyl-silyl-ester | Boiling point$_{0.15}$ 118° C | Melting point 77° C. |
| α-Methylbenzoin-trimethylsilyl-ester | Boiling point$_{0.03}$ 120° C | Melting point 32° C. |
| α-Ethylbenzoin-trimethylsilyl-ester | Boiling point$_{0.04}$ 110–113° C | n$_D^{20}$ 1.5377. |
| α-Allylbenzoin-trimethylsilyl-ester | Boiling point$_{0.01}$ 112–115° C | n$_D^{20}$ 1.5432. |
| α-Phenylbenzoin-trimethylsilyl-ester | Boiling point$_{0.02}$ 155–158° C | Melting point 43–44° C. |
| 4,4'-dimethyl-benzoin-trimethyl-silyl-ester | Boiling point$_{0.05}$ 140° C | n$_D^{20}$ 1.5412. |
| 4,4'-dimethoxy-benzoin-trimethyl-silyl-ester | Boiling point $_{0.05}$ 180° C | n$_D^{20}$ 1.5598. |

A further object of the invention is the use of the new compounds as photosensitizers in the photopolymerization of substances or substance mixtures which contain polymerizable double bonds.

A large number of sulphur-containing and halogen-containing compounds have been mentioned amongst others in the literature as compounds which initiate and accelerate photopolymerizations. Further substances which have been recommended are benzoin (U.S. Pat. No. 2,367,661) and some benzoin derivatives, such as certain α-substituted benzoins (U.S. Pat. No. 2,722,512) and benzoin-ethers of primary alcohols (U.S. Pat. No. 2,448,828) and French Pat. No. 1,450,589).

None of these compounds has been able to find industrial acceptance. As causes for this, there should be mentioned the excessively low reactivity and the inadequate storage stability in the dark of the polymerizable compounds mixed with these photosensitizers, but in part also the discoloration of the polymers, especially after prolonged storage in daylight.

Against this, the new compounds, in comparison to the hitherto known most reactive benzoin derivatives, such as benzoin-methyl-ether and benzoin-ethyl-ether, cause particularly slight discolorations in polymers when the polymers are exposed to daylight, for a prolonged period, and in part also possess excellent reactivity and storage stability in the dark.

The benzoin-alkylsilyl-esters are appropriately employed in amounts of from about 0.1 to about 5 percent by weight, preferably from about 0.5 to about 2.5 percent by weight, either individually or as a mixture with one another.

Suitable polymerizable compounds are all substances of which the carbon-carbon double bonds are activated by, for example, halogen atoms or carbonyl, cyanide, carboxyl, ester, amide, ether or aryl groups as well as carbon double bonds and carbon triple bonds. As examples there may be mentioned: styrene, vinyl toluene, divinyl benzene, vinyl acetate, vinyl chloride, vinylidene chloride, vinyl methyl ketone, acrylic and methacrylic acid, esters thereof such as the methyl, ethyl and allyl ester, their amides and nitriles, and other allyl esters, such as allyl acetate, phthalic acid diallyl ester and phosphoric acid triallyl ester, and mixtures of such compounds.

Moulding and coating compositions from mixtures, stabilized in the usual manner, of unsaturated polyesters and copolymerizable monomeric compounds can be used particularly advantageously, and here unsaturated polyesters are, as usual, to be understood as polycondensation products of α,β-unsaturated dicarboxylic acids such as maleic acid and fumaric acid, with polyols such as ethylene glycol and propanediol-1,2. A part of the unsaturated acids can be replaced by saturated acids, such as for example phthalic acid. Further modifications are possible through building-in monobasic acids and monohydric alcohols. So-called air-drying moulding compositions which apart from the radicals of α,β-unsaturated dicarboxylic acids also contain β,γ-unsaturated ether radicals, either as a constituent of further components of the mixture, can also be used.

By copolymerizable monomeric compounds, there are to be understood the unsaturated compounds which are customary in polyester technology having vinyl groups which are optionally substituted in the α-position or allyl groups substituted in the β-position, preferably styrene.

The photopolymerizable compounds or mixtures can be stabilized by the addition of usual inhibitors, for example hydroquinone, in the known amounts. Polymerization catalysts, for example peroxides, can optionally also be conjointly employed in the usual amount. In conjunction with the use of ketone hydroperoxides, metal compounds, for example cobalt naphthenate, can be added for acceleration of complete cure. In this case the storage stability of the photopolymerizable compositions is admittedly lowered. It is therefore advisable when manufacturing lacquer coatings to work in accordance with the so-called active primer method in which the coating composition is applied to a peroxide-containing layer which is applied beforehand to the substrate.

It is particularly advantageous to employ the new benzoins in those coating compositions to which paraffin or wax or wax-like substances are added, which float to the surface at the start of the polymerization and prevent the inhibiting action of atmospheric oxygen.

In order to protect light-sensitive substrates, for example light timbers, small amounts of customary ultra-violet absorbers can be added to the moulding and coating compositions without the reactivity being significantly impaired. Furthermore, small amounts of customary carriers and fillers as well as agents which confer thixotropy, such as glass fibers, synthetic fibers, silica and talcum, can be present during the photopolymerization.

As radiation sources for carrying out the photopolymerization it is possible to use natural sunlight or artificial radiators with an emission in the range of about 250 to about 500 μ, preferably from about 300 to about 400 μ. Mercury vapor lamps, xenon lamps and tungsten lamps are for example suitable. The compositions according to the invention also cure rapidly to colorless mouldings and coatings under the ultraviolet and visible radiation of low energy fluorescent lamps with an emission of rays of about 300 to about 580 μ.

When manufacturing mouldings from the sensitized compositions, it proves particularly advantageous that the compositions can be cured by appropriately metered irradiation without a significant heat effect, as a result of which larger mouldings can also be obtained free of cracks. In the absence of peroxides and metal accelerators the cure can optionally also be interrupted by placing the material in the dark and can be completed at any desired time after storage of the prepolymers thus obtained.

The new compounds can be manufactured in a manner which is in itself known by reaction of benzoins with substances which split off trialkylsilyl groups, for example trimethyl-silyl chloride, hexamethyldisilazane and N-trimethylsilylacetamide, optionally in polar solvents such as pyridine, dimethylsulphoxide and dimethylformamide.

Benzoin-trimethylsilyl-ester can be manufactured in accordance with the following instruction: a solution of 50 g of benzoin (0.236 mol) in 100 ml of hexamethyldisilazane is heated for 1 hour to the boil with exclusion of moisture after the addition of two drops of concentrated sulphuric acid. During this time the sump temperature is 125°C. During the course of the reaction ammonia is split off. Thereafter the excess hexamethyldisilazane is distilled off under normal pressure and the remainder is distilled off in vacuo. A double distillation of benzoin-trimethylsilyl-ester follows in order to purify the crude product. The boiling point of the benzoin-trimethylsilyl-ester is boiling point$_{0.15}$ 118°C and the yield is 55 g, equal to 81 percent.

α-Methylbenzoin-trimethylsilyl-ester can for example be manufactured in accordance with the following instruction: a solution of 31.5 g of α-methylbenzoin (0.139 mol) in 190 ml of hexamethyldisilazane is heated for 7 hours to the boil with exclusion of moisture, after addition of 2 drops of concentrated sulphuric acid. During this time the sump temperature is 125°C. Ammonia is split off during the course of the reaction.

Thereafter the excess hexamethyldisilazane is distilled off under normal pressure and the remainder is distilled off in vacuo. A distillation of the α-methylbenzoin-trimethylsilyl-ester follows in order to purify the crude product. The boiling point of the α-methylbenzoin-trimethylsilyl-ester is boiling point$_{0.03}$ 120°–125°C and the yield is 35.3 g, equal to 85 percent.

α-Ethylbenzoin-trimethylsilyl-ester can for example be manufactured in accordance with the following instruction: a mixture of 4.60 g of α-ethylbenzoin (0.019 mol) and 3.67 g of N-trimethylsilylacetamide is heated for 3 hours to 140°C with exclusion of moisture. Thereafter the reaction mixture is cooled to room temperature and taken up in dry toluene, and the acetamide which is insoluble in toluene is filtered off. In order to isolate the α-ethylbenzoin-trimethylsilyl-ester the toluene is distilled off at normal pressure and the remainder is distilled off in vacuo. A distillation of the α-ethyl-benzoin-trimethylsilyl-ester follows in order to purify the crude product. The boiling point of the α-ethylbenzoin-trimethylsilyl-ester is at boiling point$_{0.04}$ 110°–113°C and the yield is 4.00 g, equal to 67 percent.

EXAMPLE 1

10 g of extracted and freshly distilled acrylic acid methyl ester are mixed with 0.1 g of two known sensitizers and one sensitizer according to the invention.

Illumination is carried out with a mercury vapor high pressure lamp (Philips HPK 125 W/L) through quartz glass in a water bath at 24°C, at a distance of 10 cm. Here the solution of the sensitizer in the monomer is contained in a quartz glass of internal diameter 1.7 cm under a nitrogen atmosphere. The time of illumination is 2 ½ minutes. Immediately after the illumination the quartz glass is introduced into an acetone/solid carbon dioxide mixture in order to prevent a thermal polymerization. The solution of the polymer in the monomer and the solid polymer constituents which are present on the inside of the quartz glasses on the side facing the mercury vapor high pressure lamp are introduced into a small round flask by means of small quantities of a solvent (methylene chloride).

Thereafter unpolymerized monomeric constituents and the solvent are distilled off in a rotating evaporator. After drying in a vacuum drying cabinet to constant weight at 60°C, the amount of polymer is determined.

Table 1 contains a summary of the amounts of poly(acrylic acid methyl ester) obtained with various sensitizers.

TABLE 1

| Additives in percent by weight | Amount of poly(acrylic acid methyl ester) in percent by weight |
|---|---|
| 1 Benzoin | 16.5 |
| 1 Benzoin-ethyl-ether | 24.4 |
| 1 Benzoin-trimethylsilyl-ester | 28.2 |

If an initiator is not present, the amount of polymer is less than 0.1 percent.

EXAMPLE 2

An unsaturated polyester manufactured by condensation of 152 parts by weight of maleic anhydride, 141 parts by weight of phthalic anhydride and 195 parts by weight of propanediol-1,2 is mixed with 0.045 parts by weight of hydroquinone and dissolved in styrene to give a 65 percent by weight solution.

Two parts by weight of two different known photosensitizers on the one hand and of three different photosensitizers according to the invention on the other hand are added to 100 parts by weight at a time of this form in which the resin is supplied and the mixture is stored with exclusion of light at 60°C until it gels. Table 2 contains the sensitizers employed and the values of the storage stability at 60°C.

TABLE 2

Storage stability in the dark of the form in which a typical polyester resin is supplied, with an addition of 2 percent by weight of sensitizer.

| Sensitizer | Storage stability at 60° C. |
|---|---|
| Benzoin | less than 1 day |
| Benzoin-ethyl-ether | less than 1 day |
| α-Methylbenzoin-trimethylsilyl-ester | more than 10 days |
| αEthylbenzoin-trimethylsilyl-ester | more than 10 days |
| α-Phenylbenzoin-trimethylsilyl-ester | more than 10 days |

EXAMPLE 3

Twenty parts by weight of styrene, one part by weight of a 10 percent by weight solution of paraffin (melting point 52°–53C) in toluene as well as, on the one hand, known photosensitizers and, on the other hand, photosensitizers according to the invention in equimolar amounts are mixed into 100 parts by weight at a time of the form in which the resin is supplied, described in example 2. The solutions thus obtained are applied to glass plates by means of a film spreader (500 μ) and illuminated with the radiation from a fluorescent lamp (Osram L 40 W70–1) at a distance of 5 cm.

Table 3 contains the times for the paraffin to float to the surface and the times for reaching a pencil hardness >6 H.

TABLE 3

| Sensitizer | Additive in parts by weight relative to form in which resin is supplied | Time for the paraffin to float to the surface, after minutes | Pencil hardness >6 H, after minutes |
|---|---|---|---|
| Benzoin | 1.06 | 4.9 | 20.0 |
| α-Methylbenzoin | 1.13 | 1.9 | 16.0 |
| α-Phenylbenzoin | 1.44 | 1.6 | 16.0 |
| Benzoin-ethyl-ether | 1.20 | 0.9 | 6.0 |
| Benzoin-trimethylsilyl-ester | 1.42 | 1.3 | 8.0 |
| 4,4'-Dimethylbenzoin-trimethylsilyl-ester | 1.56 | 2.0 | 9.0 |
| 4,4'-Dimethoxybenzoin-trimethylsilyl-ester | 1.72 | 3.4 | >30 |
| α-Methylbenzoin-trimethylsilyl-ester | 1.49 | 1.6 | 9.0 |
| α-Ethylbenzoin-trimethylsilyl-ester | 1.56 | 1.9 | 14.0 |
| α-Allylbenzoin-trimethylsilyl-ester | 1.62 | 1.0 | 12.0 |
| α-Phenylbenzoin-trimethylsilyl-ester | 1.80 | 1.7 | >30 |

In contrast to benzoin and benzoin-ethyl-ether the new compounds are distinguished by the fact that they give practically no cause for discolorations both during polymerization and also on subsequent storage of the polymers under the influence of light.

EXAMPLE 4

One hundred parts by weight of the form in which the resin is supplied, described in Example 2, are mixed with 20 parts by weight of styrene, one part by weight of a 10 percent by weight solution of paraffin (melting point 52°–53°C) in toluene and two parts by weight of α-methylbenzoin-trimethylsilyl-ester and additionally with various peroxides, metal containing compounds and ultraviolet absorbers. Five hundred μ thick layers of these solutions are applied to glass plates by means of a film spreader and exposed to the radiation of the fluorescent lamp described, at a distance of 5 cm. The times for the paraffin to float to the surface and the times until a pencil hardness >6 H is reached are contained in Table 4.

TABLE 4

| Additives, relative to form in which resin is supplied per cent by weight | Time for the paraffin to float to the surface, after minutes | Pencil hardness >6H, after minutes |
| --- | --- | --- |
| 4 Cyclohexanone peroxide (50% strength in plasticizer | 1.3 | 12 |
| 4 Methyl ethyl ketone peroxide (40% strength in plasticizer | 1.4 | 13 |
| 2 Cobalt naphthenate solution (20% strength in toluene) 4 Methyl ethyl ketone peroxide (40% strength in plasticizer | 1.3 | 11 |
| | 3.5 | 28 |
| 2 Cobalt naphthenate solution (20% strength in toluene) 0.05 α-Cyano-α-(4-methoxyphenyl)-methacrylic acid butyl ester | 1.9 | 14 |

We claim:
1. In the process of photopolymerizing a moulding and coating composition comprising (a) an unsaturated polyester of an α,β-unsaturated dicarboxylic acid and a polyol and (b) a copolymerizable monomer, the improvement comprising employing as sensitizer a benzoin-silyl ester of the formula

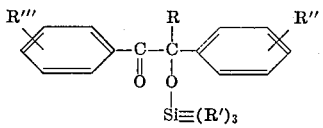

wherein R represents hydrogen, lower alkyl or alkenyl having one to about four C-atoms, aralkyl or phenyl, R' represents lower alkyl having one to about four C-atoms and R'' and R''', which may be identical or different, represent hydrogen, halogen, lower alkyl having one to about four C-atoms, or methoxy.
2. The process of claim 1 wherein R and R'' and R''' are hydrogen and R' is methyl.
3. The process of claim 1 herein R and R' are methyl and R'' and R''' are hydrogen.
4. The process of claim 1 wherein R is ethyl, R' is methyl and R'' and R''' are hydrogen.
5. The process of claim 1 wherein R is allyl or phenyl, R' is methyl and R'' and R''' are hydrogen.
6. The process of claim 1 wherein R is hydrogen and R' and R'' and R''' are methyl.
7. The process of claim 1 wherein R is hydrogen, R' is methyl and R'' and R''' is methoxy.

* * * * *